United States Patent [19]
Kishi

[11] Patent Number: 4,695,875
[45] Date of Patent: Sep. 22, 1987

[54] AUTOMATIC HUE CORRECTION CIRCUIT

[75] Inventor: Hiroyasu Kishi, Gunma, Japan

[73] Assignee: Sanyo Electric Co., Ltd., Osaka, Japan

[21] Appl. No.: 835,844

[22] Filed: Mar. 3, 1986

[30] Foreign Application Priority Data

| Mar. 14, 1985 | [JP] | Japan | 60-50867 |
| Mar. 14, 1985 | [JP] | Japan | 60-50868 |
| Mar. 14, 1985 | [JP] | Japan | 60-50869 |
| Aug. 10, 1985 | [JP] | Japan | 60-176551 |
| Aug. 20, 1985 | [JP] | Japan | 60-182422 |

[51] Int. Cl.⁴ ............................................. H04N 9/64
[52] U.S. Cl. ...................................... 358/28; 358/27
[58] Field of Search .................. 358/28, 23, 21 R, 27

[56] References Cited

U.S. PATENT DOCUMENTS 4,261,009 4/1981 Tumimoto et al. ............... 358/28 X
4,364,082 12/1982 Tonomura et al. ................. 358/28

OTHER PUBLICATIONS

"IC Data Hot Service", Nippon TEC Data Corp. Jun., 1981, pp. 6-322.

Primary Examiner—James J. Groody
Assistant Examiner—Victor R. Kostak
Attorney, Agent, or Firm—Armstrong, Nikaido Marmelstein & Kubovcik

[57] ABSTRACT

An automatic hue correction circuit in a television receiver has been found. The present circuit forms a Q signal and an I signal by demodulated three color difference signals. Then, the present circuit compensates hue automatically by rotating demodulation axes so that a level of the Q signal becomes smaller, when a level of the I signal is larger than a reference level.

8 Claims, 26 Drawing Figures

AUTOMATIC HUE CORRECTION CIRCUIT

BACKGROUND OF THE INVENTION

The present invention relates to an automatic hue (tint) correction circuit for correcting hue automatically in a television receiver. This invention is suitable, in particular, for use in a NTSC television receiver.

A hue correction circuit which adjusts hue by handling a hue (tint) volume manually is known. The following document discloses an IC (integrated circuit) of HA11436 which contains an automatic hue correction circuit capable of correcting hue automatically: "IC DATA HOT SERVICE ", NIPPON TECH DATA Corp., June 1981, pp 6–322. FIG. 1 is a block diagram of this integrated circuit. In this figure, a first band-pass amplifier 2 amplifies a composite color picture signal applied from a detection circuit (not shown) in the television receiver to an input terminal 1. A second band-pass amplifier 3 amplifies an output signal of the first band-pass amplifier 2 and separates a chroma (color) signal and a burst signal from an amplified video signal. An automatic chroma control (ACC) circuit 4 controls a gain of the first band-pass amplifier 2 in accordance with the burst signal at one of the two output terminals of the second band-pass amplifier 3. A phase-locked loop (PLL) circuit 7 which includes a phase comparator 5 and a voltage-controlled oscillator (VCO) 6 generates a local subcarrier wave (CW) signal which is synchronized to the burst signal. A hue (tint) adjustment circuit 9 which is used togehter with a tint volume 8 of a variable resistor, performs a hue adjustment by controlling the phase of the CW signal. A first phase shift circuit (PS) 10 shifts the phase of the output signal of the hue adjustment circuit 9 by $\phi_1$ and generates a $CW_{R-Y}$ signal which is a subcarrier signal on a (R−Y) axis. A second phase shift circuit 11 shifts the phase of the output signal of the hue adjustment circuit 9 by $\phi_2$ and generates a $CW_{B-Y}$ signal which is a subcarrier signal on a (B−Y) axis. A demodualtion circuit 12 demodulates a (R−Y) color difference signal by using the $CW_{R-Y}$ signal, and also demodulates a (B−Y) color difference signal by using the $CW_{B-Y}$ signal. Further, the demodulation circuit 12 forms a (G−Y) color difference signal by matrixing the (R−Y) signal and the (B−Y) signal. Therefore, the circuit thus arranged can produce the (R−Y) color difference signal, the (G−Y) color difference signal and the (B−Y) color difference signal with the composite color picture signal applied to the input terminal 1.

Furthermore, the circuit structure of FIG. 1 has the following elements. A third phase shift circuit 16 generates a $CW_Q$ which is a subcarrier signal on a Q axis shifted by $\phi_3$ relative to the CW signal. A fourth phase shift circuit 17 generates a $CW_I$ signal which is a subcarrier signal on an I axis shifted by $\phi_4$ relative to the CW signal. A Q axis-demodulation circuit 18 generates a Q signal by demodulating the chroma signal on the Q axis by the $CW_Q$ signal. An I axis-demodulation circuit 19 generates an I signal by performing the I axis-demodulation of the chroma signal by the $CW_I$ signal. An amplification circuit 20 amplifies the Q signal derived from the Q axis demodulation circuit 18 and adjusts the hue adjustment circuit 9 by an amplified Q signal. A control circuit (CONT) 21 compares the I signal derived from the I axis demodulation circuit 19 with a reference signal ($V_{ref}$), and makes the amplification circuit 20 operate when the I signal exceeds the reference signal ($V_{ref}$), and on the contrary makes the amplification circuit 20 non-operable when the I signal does not exceed the reference signal. Therefore, in the circuit thus arranged, when the chroma signal approaches the I axis and then its level exceeds that of the reference signal, the amplification circuit 20 is driven by the control circuit and the hue adjustment circuit 9 adjusts hue so that the chroma signal near the I axis overlaps with the I axis by using the amplified Q signal. A signal on the I axis corresponds to flesh color. Therefore, the hue adjusting described previously means that a color near that of flesh color is corrected so as to be changed into the correct color.

The phase relationship between the CW signal, the $CW_{R-Y}$ signal, the $CW_{B-Y}$ signal, the Q signal and the I signal is shown in FIG. 2.

As apparent from the foregoing, the prior circuit is so designed that the automatic hue correction is performed in accordance with the level of the Q signal formed from the chroma signal by the Q axis-demodulation circuit 18.

However, the prior automatic hue correction circuit of FIG. 1 has the following disadvantages. The circuit has no feedback loop so that a corrected result, or the output signal of the hue adjustmen circuit 9 is returned to the input side of the hue correction circuit. Thus, the following two operative conditions are, in fact, required to carry out a precise hue correction. First of all, the gain of the amplification circuit 20 is an important factor. That is, the gain affects the hue correction. In details, the compensation of hue will excessively performed if the gain is too large and, on the other hand, the compensation will be insufficient if the gain is too small. This means that it is necessary to adjust the gain of the amplification circuit 20 strictly, which causes a complicated adjustment operation of the gain. Secondly, it is required that the adjustment characteristic of the hue adjustment circuit 9 is identical with the characteristic of the Q signal. However, it is difficult to obtain this identity.

SUMMARY OF THE INVENTION

It is an object, therefore, of the present invention to overcome the disadvantages of a prior automatic hue correction circuit by providing a new automatic hue correction circuit.

It is also an object of the present invention to provide a new automatic hue correction circuit which is capable of performing the hue correction exactly by reducing the influences resulting from the gain of the amplification circuit or the deflection between the adjustment characteristic of the hue adjustment circuit and the characteristic of the Q signal.

It is a further object of the present invention to provide several types of automatic hue correction.

The above and the other objects are attained by an automatic hue correction circuit in a color television receiver which comprises demodulation means for demodulating three color difference signals from a chroma signal which is separated from a received composite video signal. A first composition means compsoes a Q signal by using the color difference signals. A second composition means composes an I signal. A by using the color difference signals, amplification means produces an adjustment signal which is formed from the Q signal derived from the first composition means. A hue correction means supplies to the demodulation means a subcarrier signal for rotating demodulation axes in the demodulation means so that the level of the Q signal becomes smaller in accordance with the adjustment signal derived from the amplification means. A control means makes the amplification means active when the level of the I signal derived from the second composition means exceeds a reference level.

BRIEF DESCRIPTON OF THE DRAWINGS

Further objects, features and advantages of the present invention can be more fully understood by means of the following description and accompaning drawings wherein.

Figure 4:
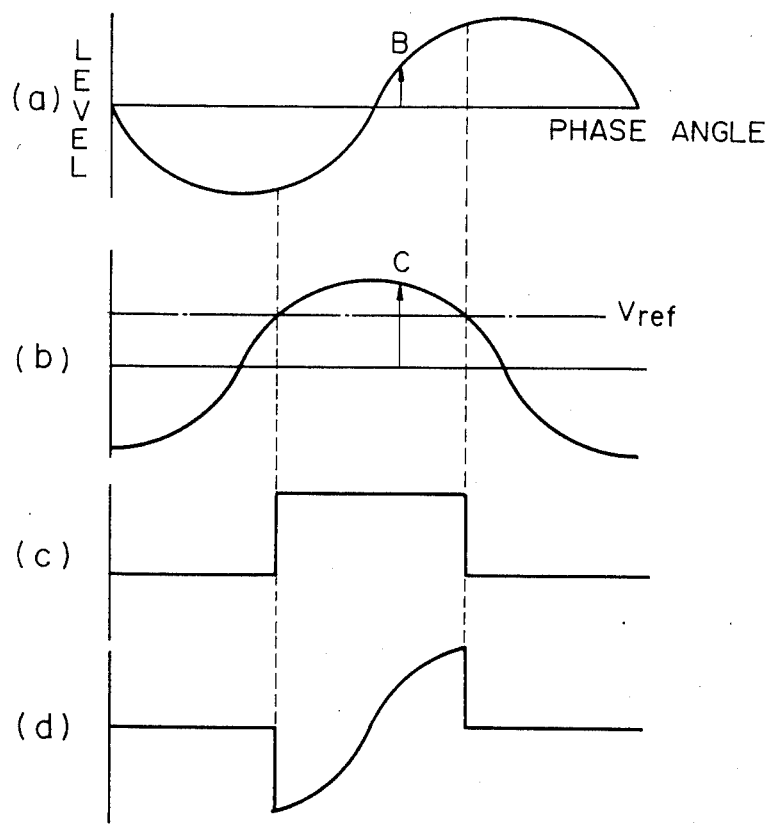
Figure 3:
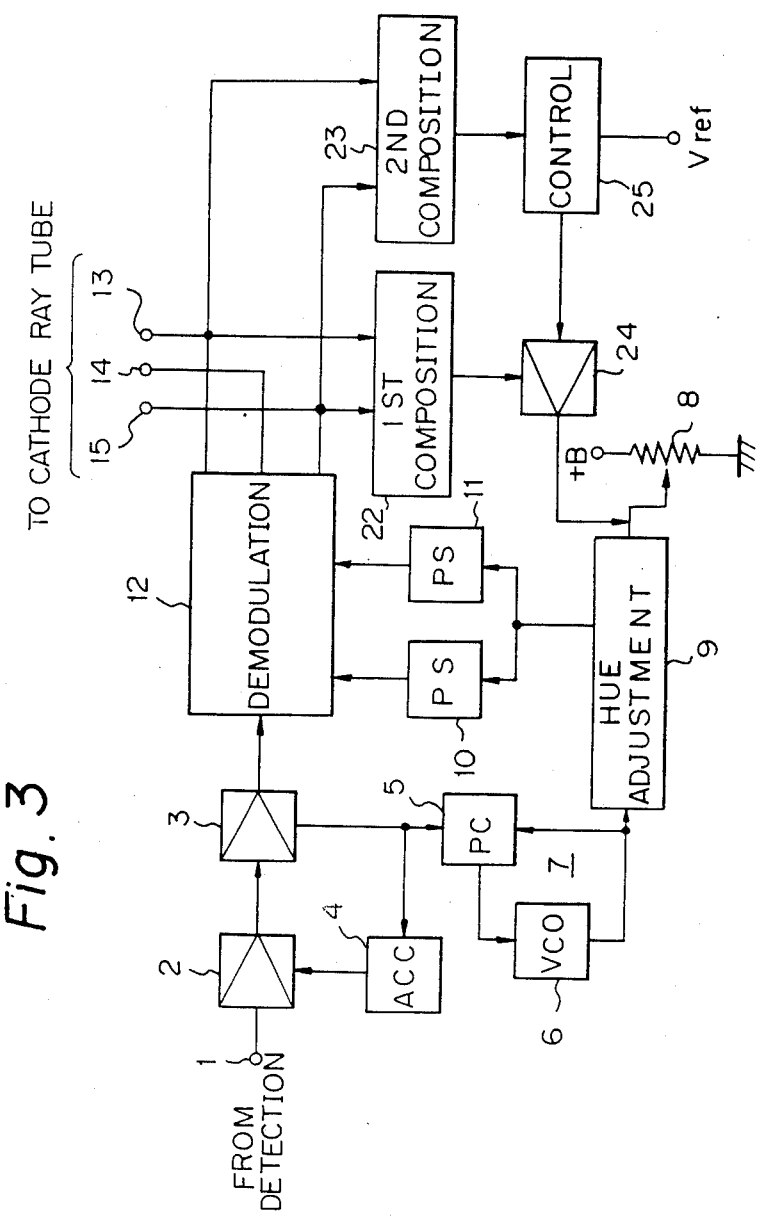
Figure 5:
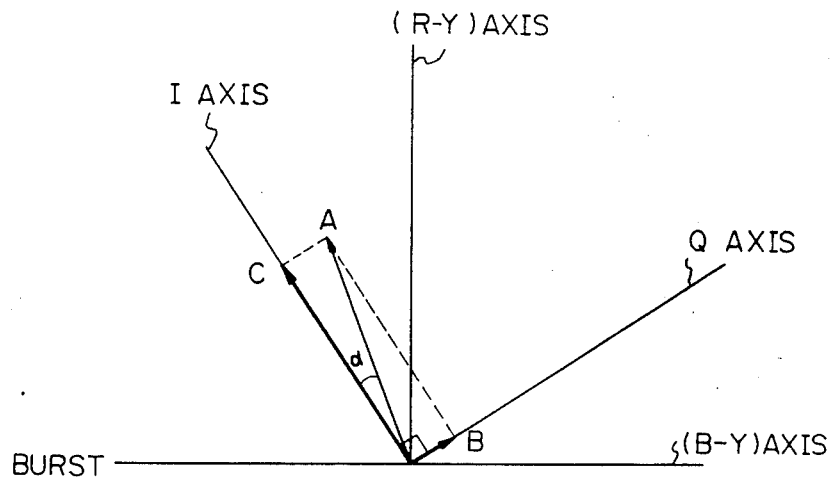
Figure 6:
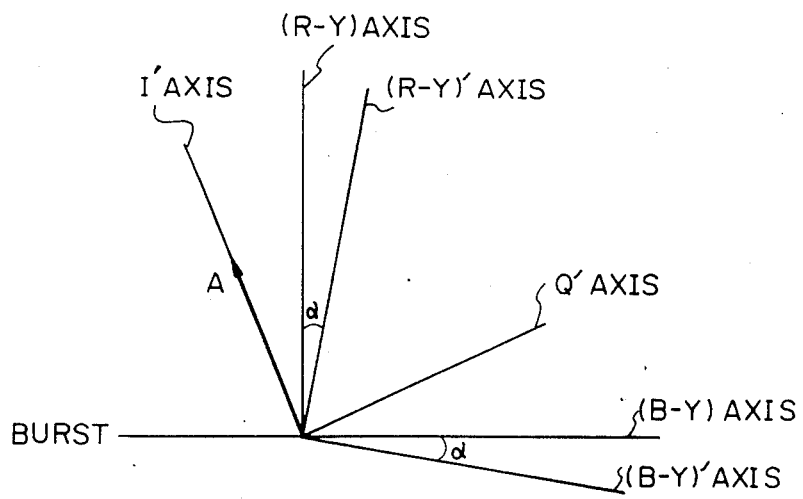
Figure 7A:
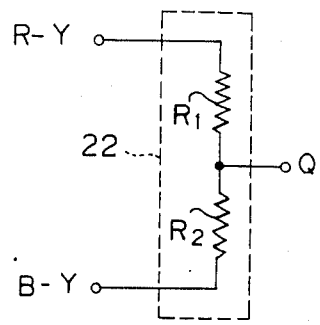
Figure 7B:
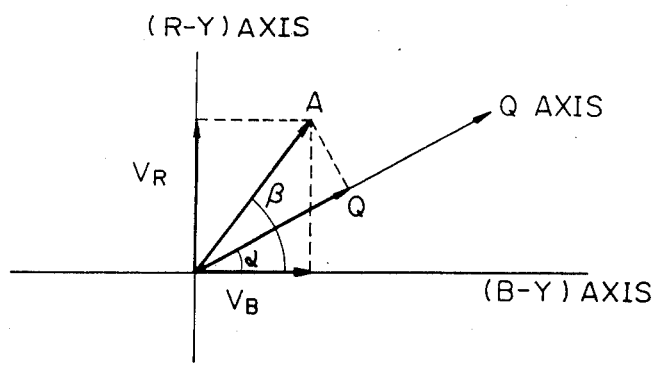
Figure 8:
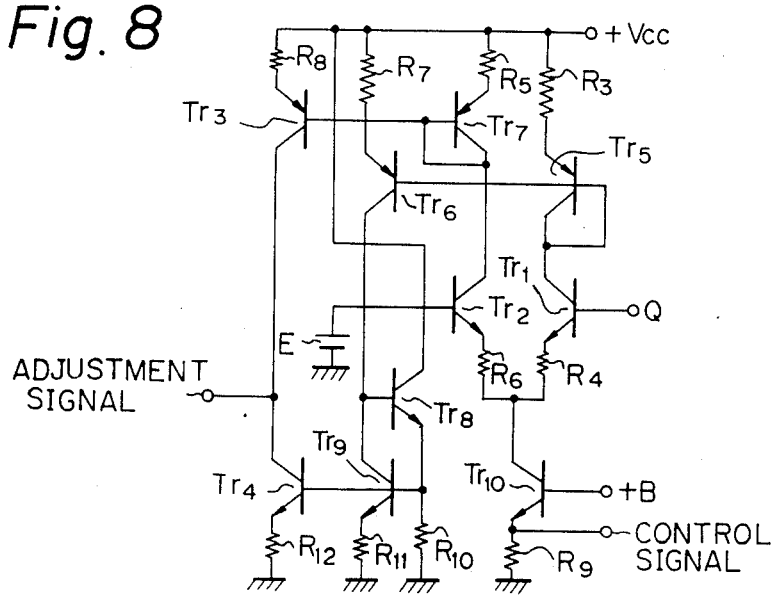
Figure 9:
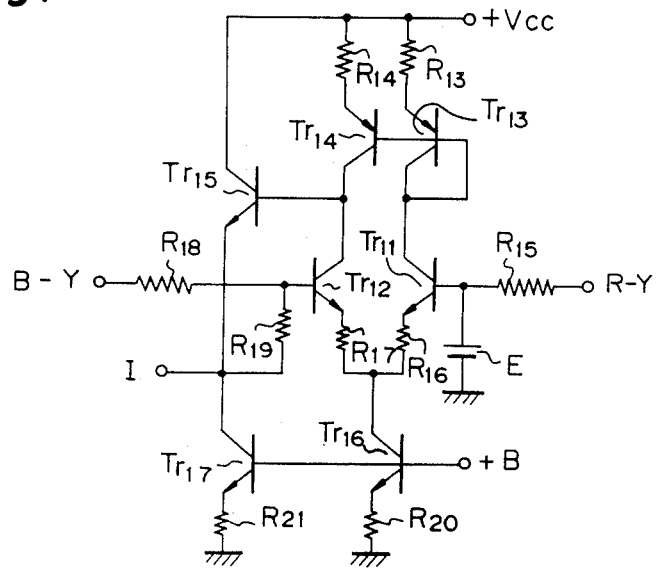
Figure 10:
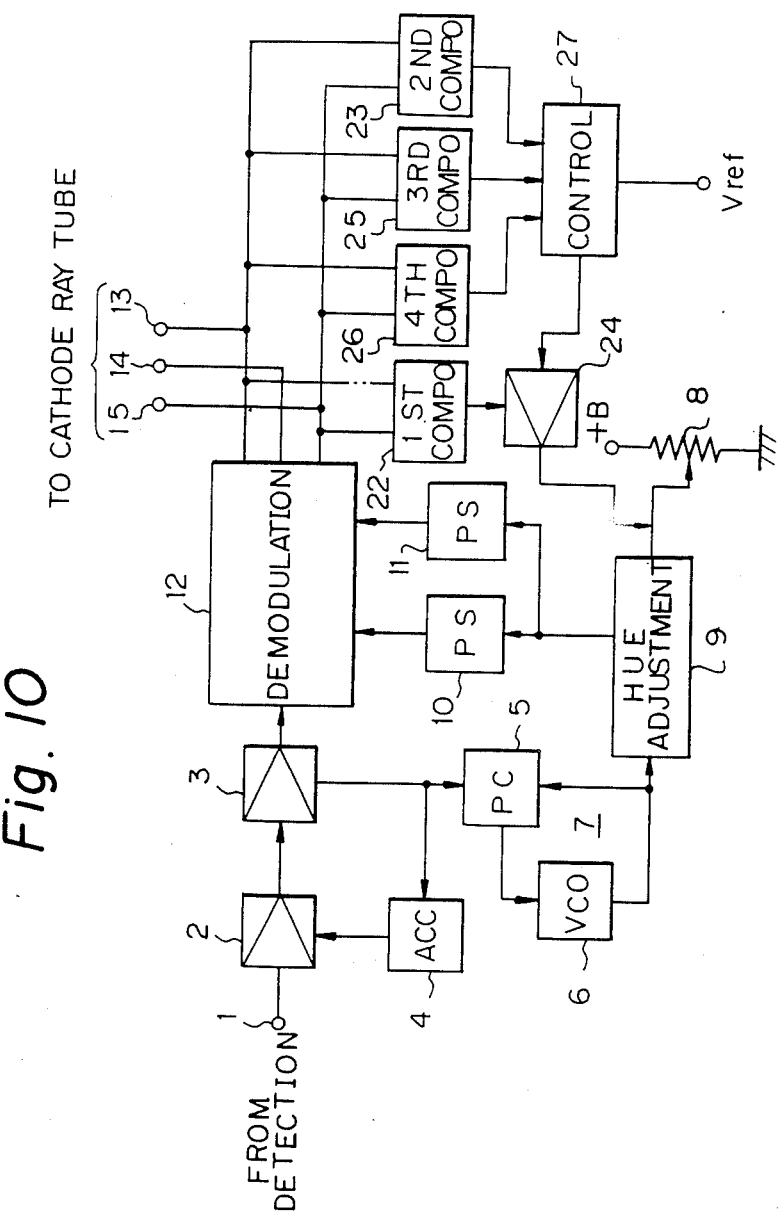
Figure 11:
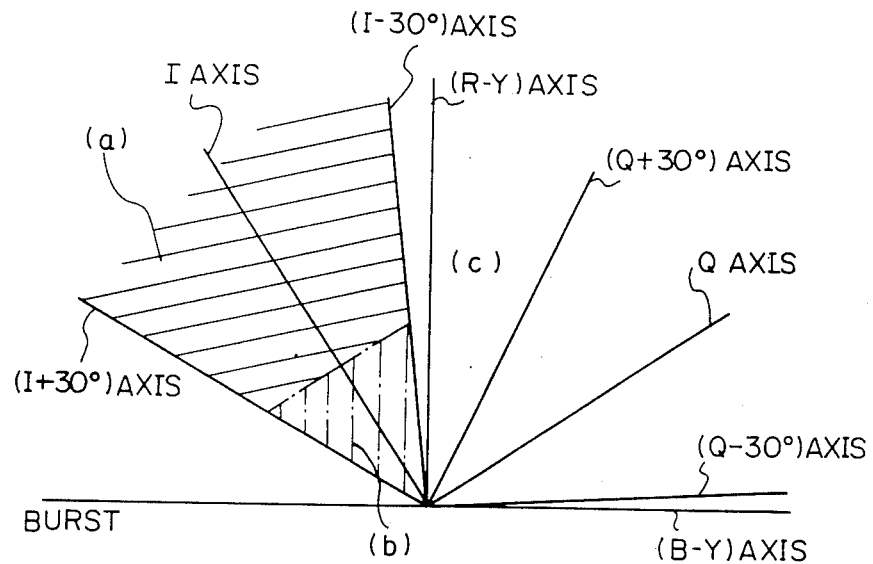
Figure 12:
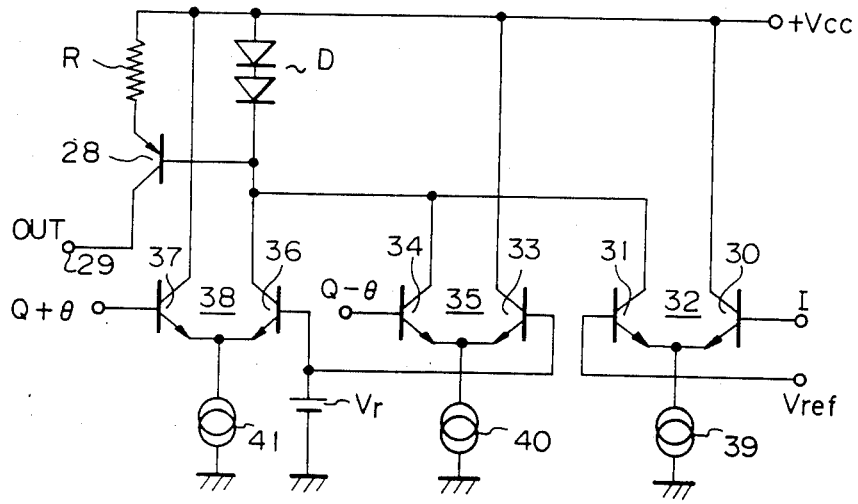
Figure 13:
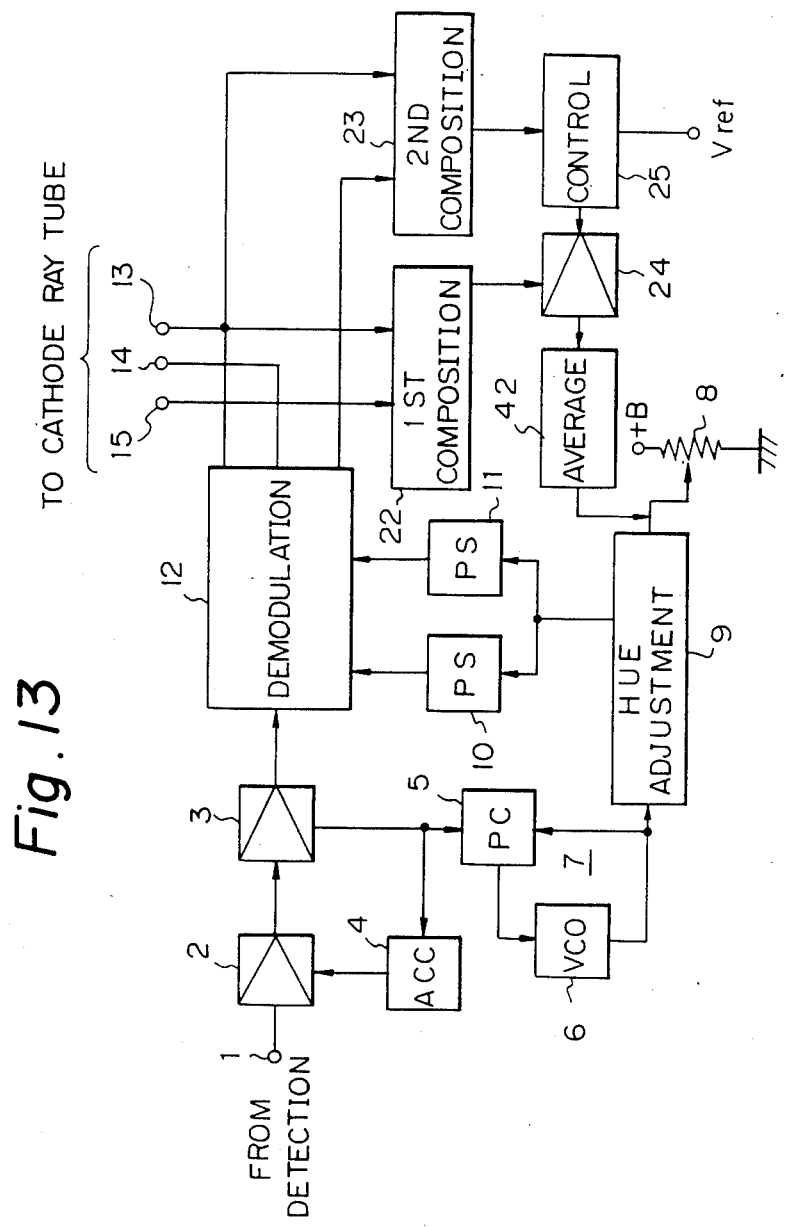
Figure 14A:
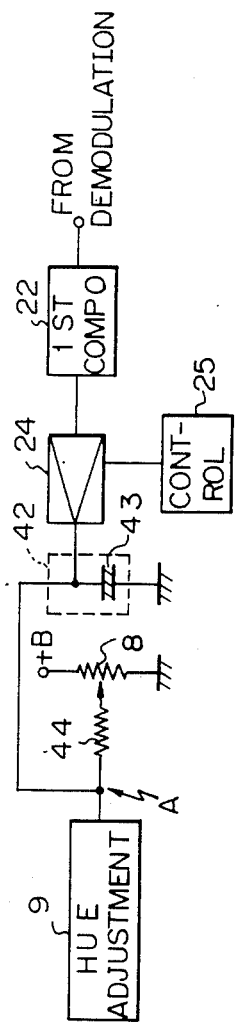
Figure 14B:
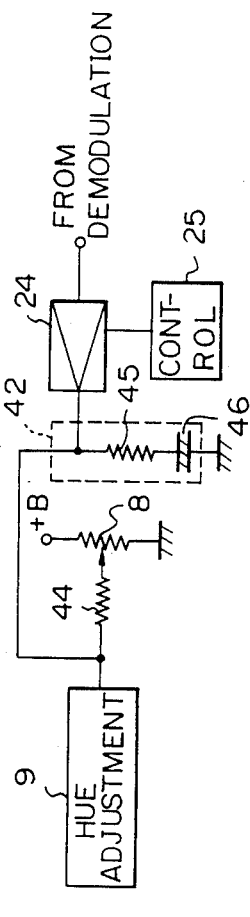
Figure 14C:
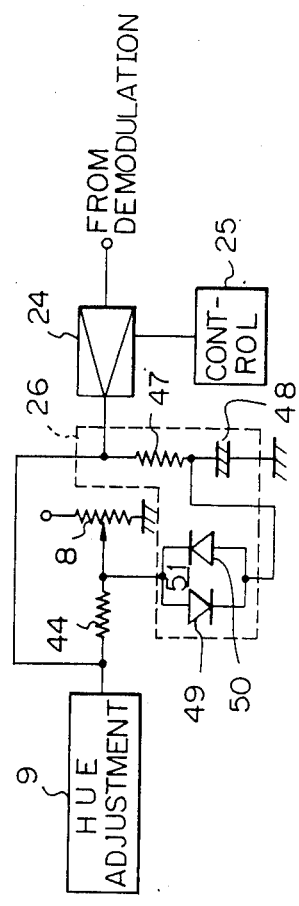
Figure 15:
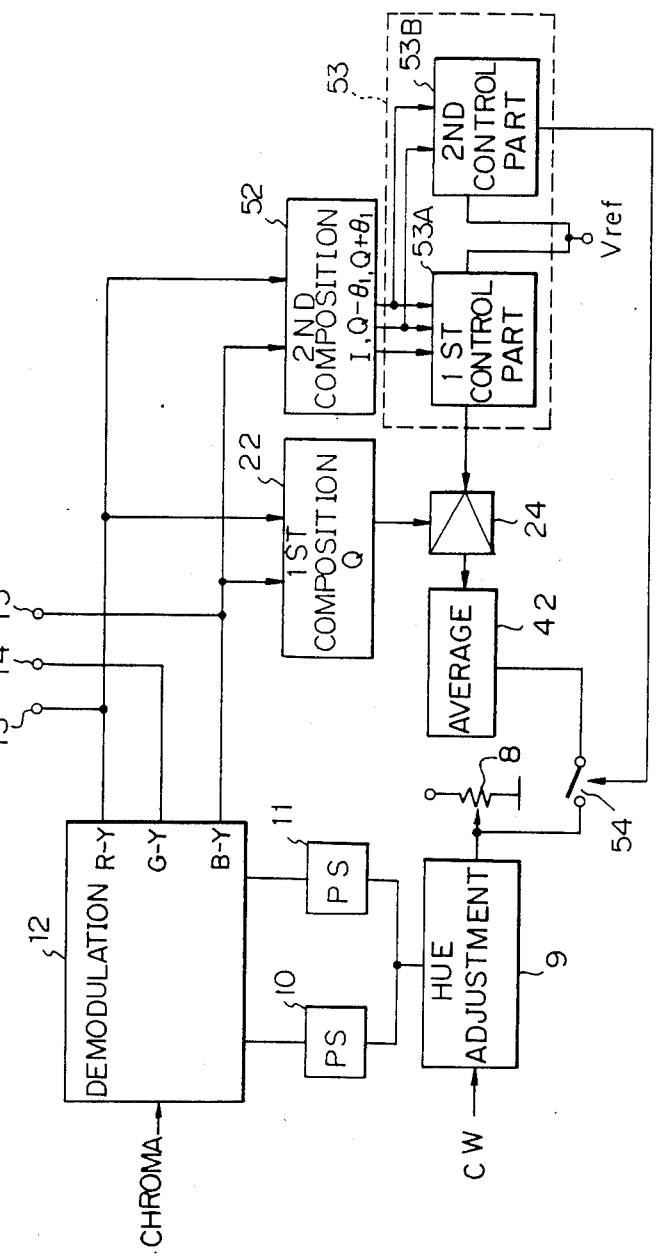
Figure 16:
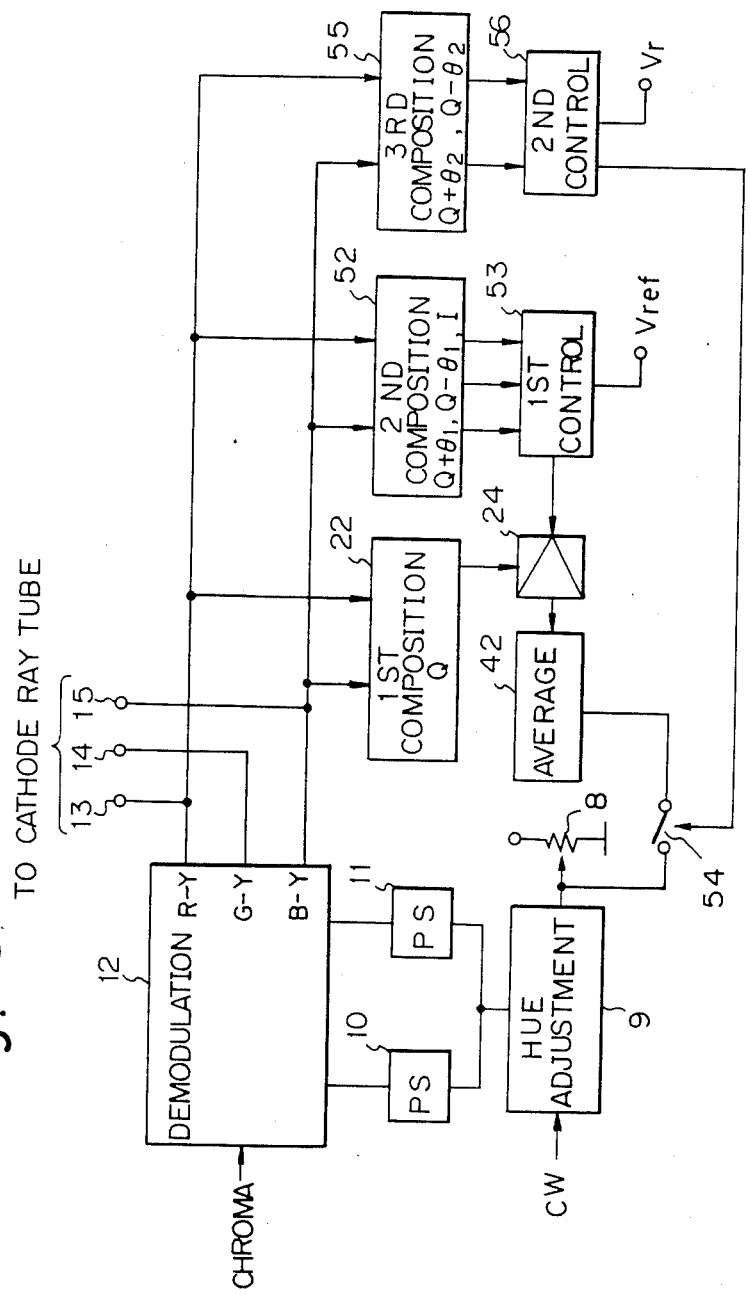
Figure 17:
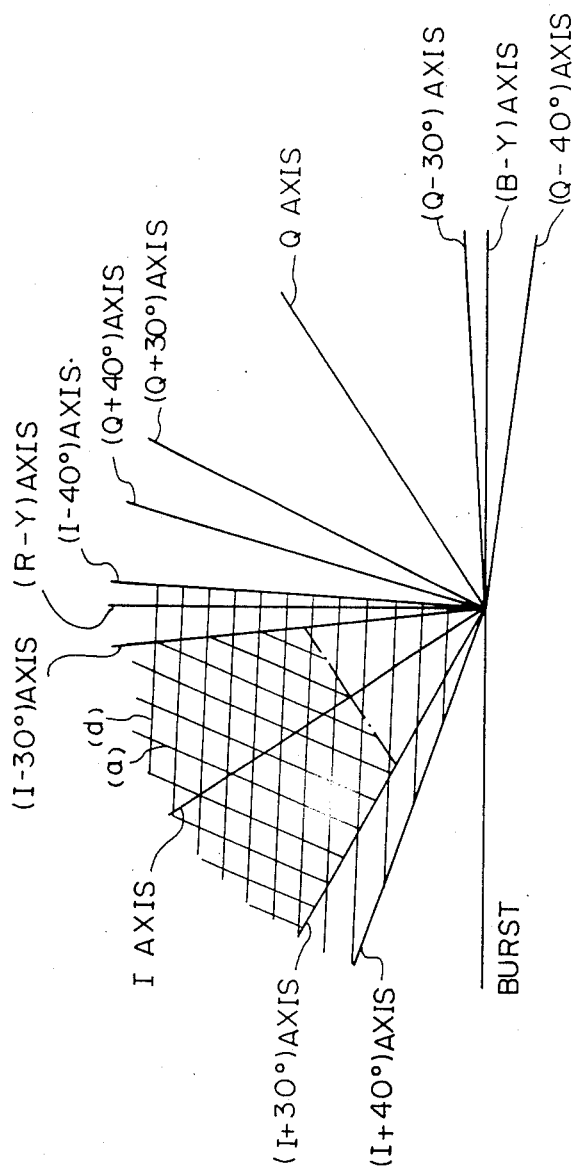
Figure 18:
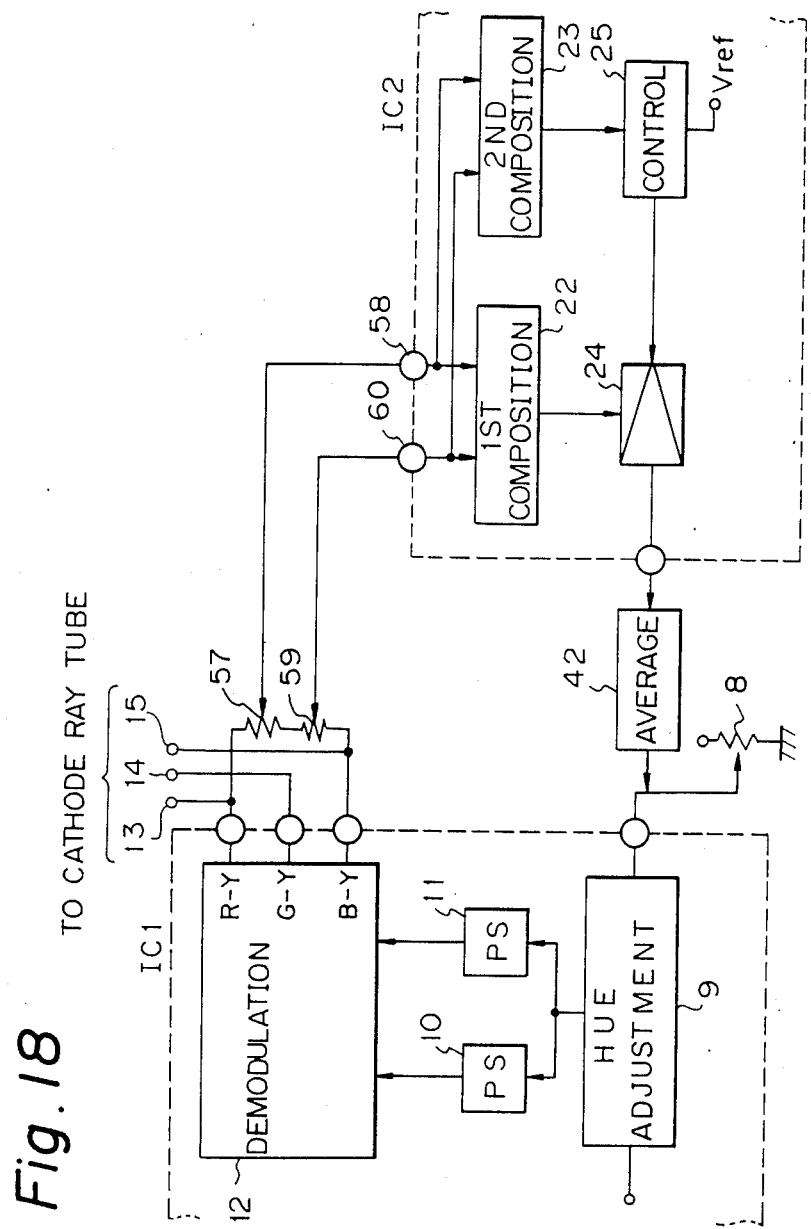
Figure 19A:
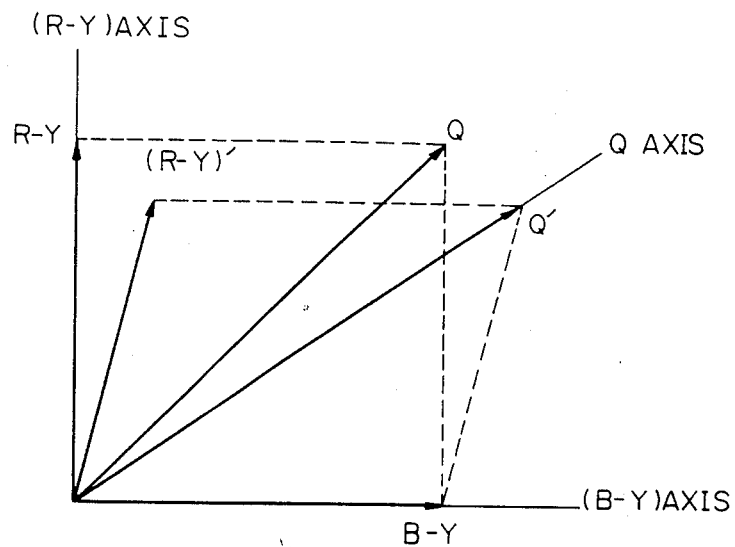
Figure 19B:
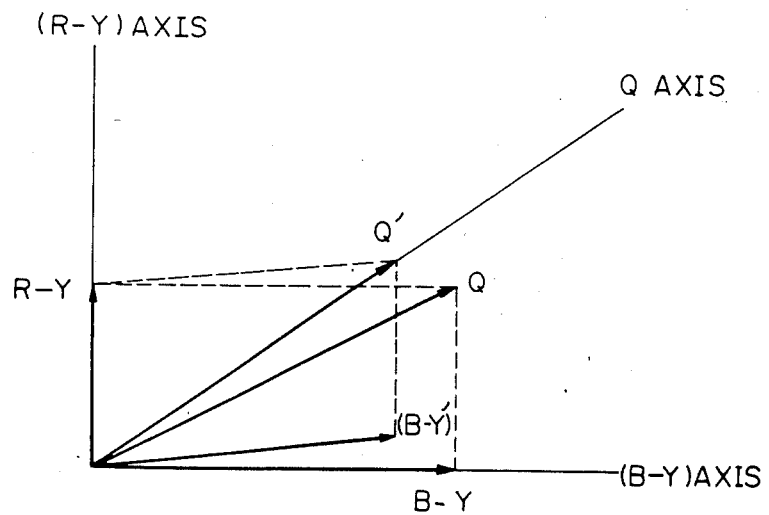
Figure 20:
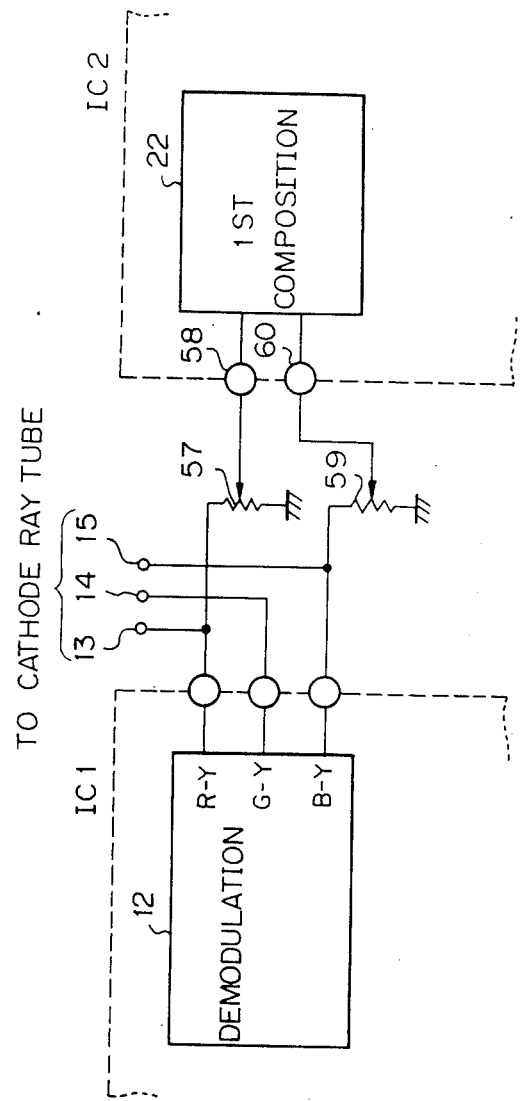
Figure 21A:
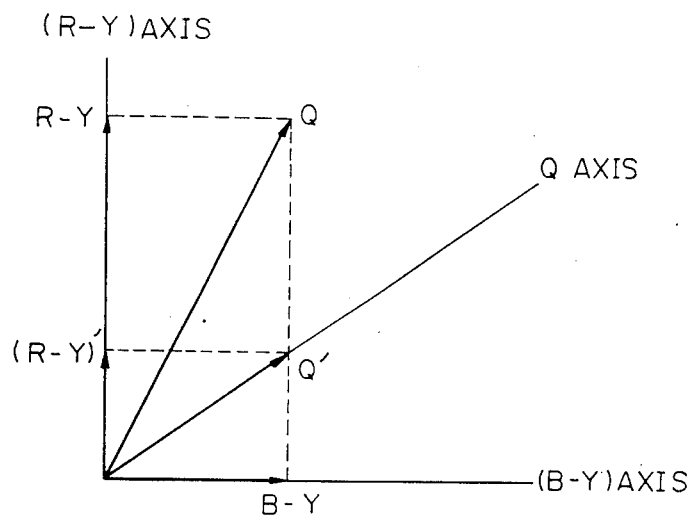
Figure 21B:
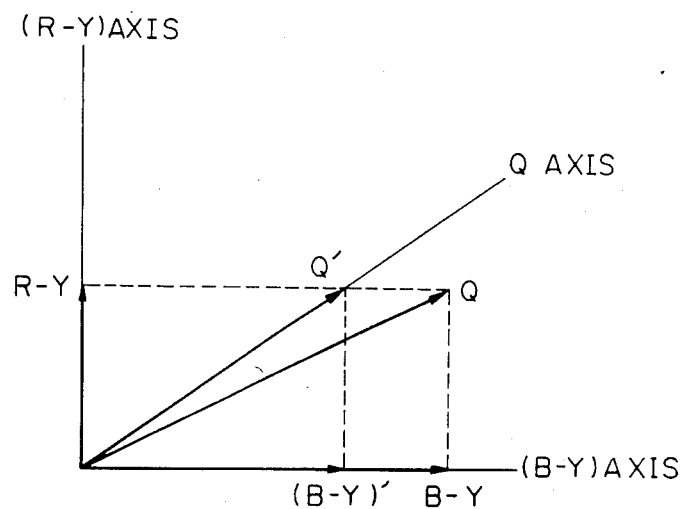

FIG. 3 is a block diagram of the first embodiment according to the present invention, FIG. 4 shows waveforms at portions on the circuit of FIG. 3, FIG. 5 shows the relationship between the chroma signal to be corrected and the demodulation axes, FIG. 6 shows the relationship between the chroma signal which has been corrected and the demodulation axes, FIG. 7A is a detailed circuit diagram of the first composition circuit in FIG. 3, FIG. 7B shows the principle of the first composition circuit of FIG. 7A, FIG. 8 is a detailed circuit diagram of the amplification circuit in FIG. 3, FIG. 9 is a detailed circuit diagram of the second composition circuit in FIG. 3, FIG. 10 is a block diagram of the second embodiment according to the present invention FIG. 11 shows the range in which the automatic hue correction is performed by the second embodiment of FIG. 10, FIG. 12 is a detailed circuit diagram of the control circuit in FIG. 10, FIG. 13 is a block diagram of the third embodiment according to the present invention, FIGS. 14A through 14C are detailed circuit diagrams of the averaging circuit in FIG. 13, FIG. 15 is a block diagram of the fourth embodiment according to the present invention, FIG. 16 is a block diagram of a variation of the structure of FIG. 15, FIG. 17 shows range in which the automatic hue correction of the chroma signal is performed by the fourth embodiment, FIG. 18 is a block diagram of the fifth embodiment according to the present invention, FIGS. 19A and 19B show the explanation views of the correction of the Q signal in the structure of FIG. 18, FIG. 20 is a block diagram of a variation of the structure of FIG. 18, and FIG. 21A and 21B show the explanation views of the correction of the Q signal in the structure of FIG. 20.

DESCRIPTION OF THE PREFERRED EMBODIMENTS

Figure 1:
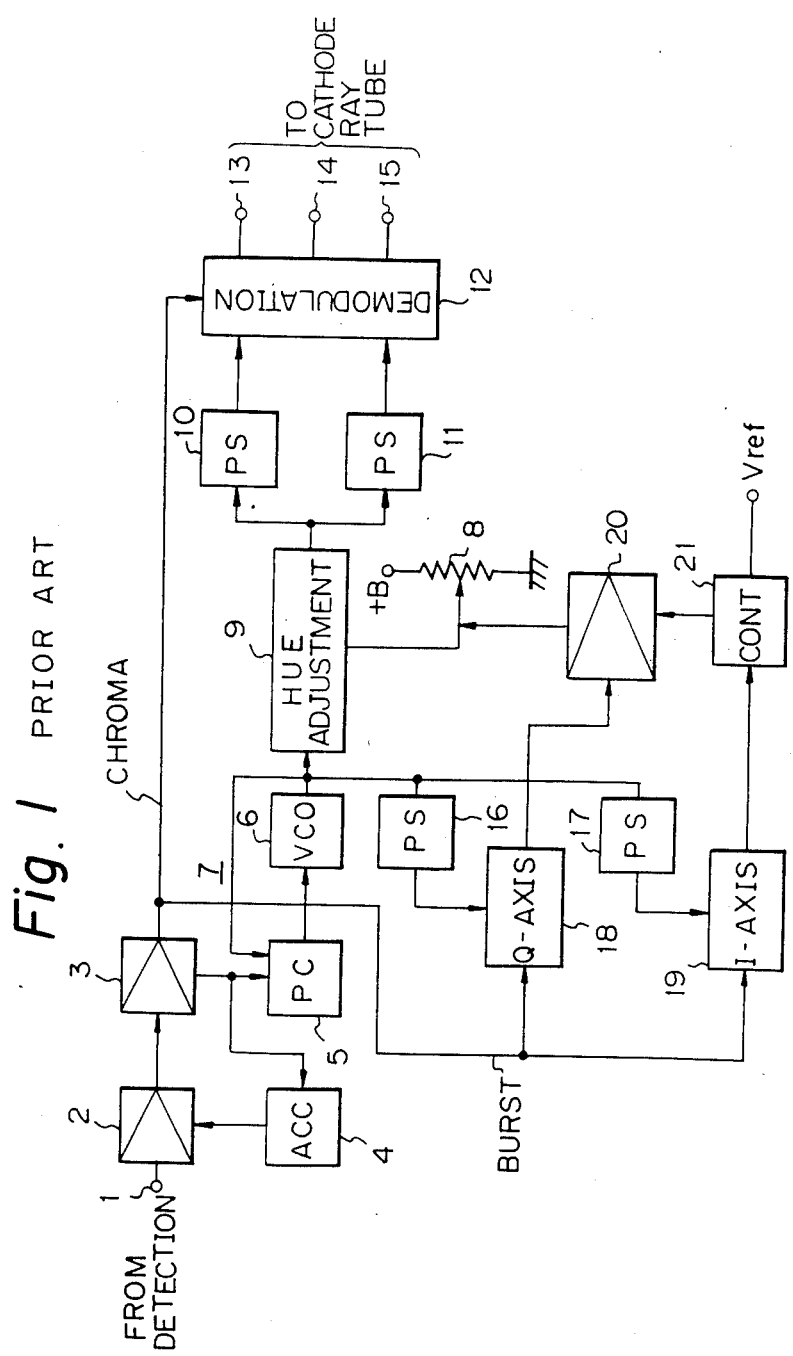
FIG. 1 is a block diagram of a prior automatic hue correction circuit.
Figure 2:
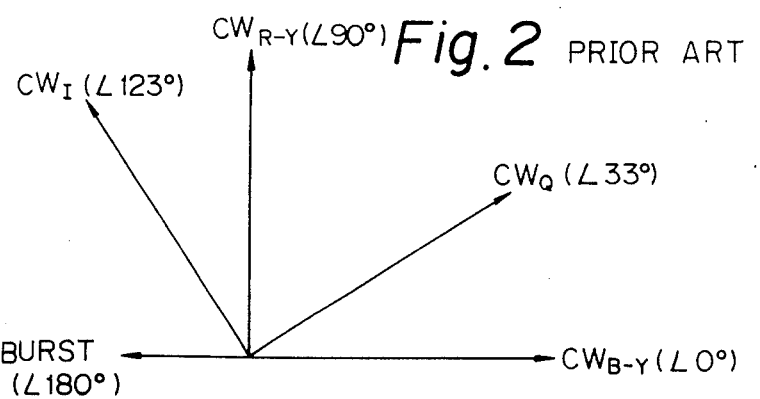
FIG. 2 shows the phase relationship of the demodulation axes.

FIG. 3 is a block diagram of the first embodiment according to the present invention, wherein the same reference numerals show the same members as those shown in FIG. 1. A first composition circuit 22 composes the (R−Y) color difference signal at the first output terminal 13 of the demodulation circuit 12 and the (B−Y) color difference signal at the third output terminal 15 thereof and then generates a Q signal. A second composition circuit 23 also composes the (R−Y) color difference signal at the output terminal 13 and the (B−Y) color difference signal at the output terminal 15 and then generates an I signal. An amplification circuit 24 amplifies the Q signal derived from the first composition circuit 22 and then supplies a resultant signal, called an adjustment signal to the hue adjustment circuit 9. A control circuit 25 compares the I signal derived from the second composition circuit 23 with a reference signal ($V_{ref}$) and then makes the amplification circuit 24 operate when the level of the I signal exceeds that of the reference signal.

In operation, the composite video signal which is supplied from the detection circuit (not shown) to the input terminal 1 is amplified by the first band-pass amplifier 2. The amplifiation video signal is further amplified and is then separated into the chroma signal and the burst signal by the second amplifier 3. the chroma signal is supplied to the demodulation circuit 12 and is then demodulated thereby. On the other hand, the burst signal is applied to the phase comparator 5 and is used therein to form the CW signal. The burst signal is also supplied to the ACC circuit 4 and is used therein to control the gain of the first band-pass amplifier 2. The phase comparator 5, which forms the PLL circuit 7 together with the VCO 6, is designed to compare the phase of the burst signal with that of the output signal of the VCO 6. Therefore, at the output terminal of the VCO 6 there is generated the CW signal in phase with the burst signal. The CW signal is applied to the hue adjustment circuit 9 and is used therein to adjust hue. The first phase shift circuit 10 and the second phase shift circuit 11 generate the $CW_{R-Y}$ signal and the $CW_{B-Y}$ signal which are shifted by phases $\phi_1$, and $\phi_2$ relative to the CW signal, respectively. The (R−Y) color difference signal is demodulated with the $CW_{R-Y}$ signal applied to the demodulation circuit 12, and the (B−Y) color difference signal is demodulated with the $CW_{B-Y}$ signal applied to the demodulation circuit 12. The (G−Y) color difference signal is derived from the demodulation circuit 12 by matrixing the demodulated (R−Y) color difference signal and the demodulated (B−Y) color difference signal. Then, the (R−Y) signal, the (G−Y) signal and the (B−Y) signal are transferred to a following stage (for instance, a cathode ray tube; not shown) through the first, second and third output terminals 13, 14 and 15, respectively.

The (R−Y) color difference signal at the output terminal 13 and the (B−Y) color difference signal at the output terminal 15 are composed by the first composition circuit 22, which delives the Q signal to the output terminal thereof. The Q signal is then amplified by the amplification circuit 24, which supplies the amplified Q signal as the adjustment signal to the hue adjustment circuit 9. The amplification circuit 24 acts as a voltage-current converter for the Q signal, for example. That is, the variation of the voltage of the Q signal at its input is converted into that of the current at its output. The (R−Y) color difference signal and the (B−Y) color difference signal are also composed by the second composition circuit 23, which delivers the I signal to the output terminal thereof. When the level of the I signal is larger than that of the reference signal ($Vx_{ref}$), the control circuit 25 generates a control signal, which makes the amplification circuit 24 achieve. The circuit 24 continues to amplify the Q signal and supply the adjustment signal to the hue adjustment circuit 9 while the control signal is applied thereto. On the other hand, when the level of the I signal is smaller than that of the reference signal, the control circuit 25 feeds no control signal to the amplification circuit 24, and thus the amplification circuit 24 can not operate. This means the automatic hue adjustment can not be performed, when no control signal is applied to the amplification circuit 24.

FIG. 4 shows waveforms at four portions on the circuit of FIG. 3, wherein the axes of the abscissas show a phase angle and the axes of the ordinates show a signal level. FIG. 4(a) shows the Q signal at the output terminal of the first composition circuit 22, and (b) shows the I signal at the output terminal of the second composition circuit 23. The I signal of FIG. 4(b) is compared with the reference signal by the control circuit 25, which feeds the control signal shown in FIG. 4(c) to the amplification circuit 24 while the level of the I signal exceeds that of the reference signal. Then, the amplification circuit 24 can operate as long as the control signal exists. At this time, the adjustment signal of FIG. 4(d) is derived from the output terminal of the amplification circuit 24, thereby the automatic hue correction is performed.

The description willnow be given for the automatically correcting hue operation in the circuit of FIG. 3. Assuming that that there exists a chroma signal A whose phase is clockwise shifted by the angle $\alpha$, the leve of the Q signal is B and the level of the I signal is C, as shown in FIG. 5. If the level C of the I signal is larger than that of the reference signal ($V_{ref}$), the amplification circuit 24 operates to amplify the Q signal and then supplies the adjustment signal to the hue adjustment circuit 9. The phase of the CW signal from the VCO 6 then rotates corresponding to the level of the adjustment signal which, of course, corresponds to the level of the Q signal linearly) and thus the phases of the $CW_{R-Y}$ signal and the $CW_{B-Y}$ signal which are output signals of the first phase shift circuit 10 and the second phase shift circuit 11 also rotate, respectively. This means that the demodulation axes in the demodulation circuit 12 rotate. Therefore, as shown in FIG. 6, the (R−Y) axis rotates by the angle $\alpha$ to become a (R−Y)' axis and the (B−Y) axis rotates by the angle $\alpha$ to become a (B−Y)' axis. According to the present invention, the I axis and the Q axis also rotate in accordance with the rotations of the demodulation axes, because the Q signal is formed by the (R−Y) color difference signal and the (B−Y) color difference signal. Therefore, at the time when the hue correction has been achieved (FIG. 6), the chroma signal overlaps with an I' axis and the level of the Q signal becomes zero. In other words, the automatic hue correction of the invention is directed to rotate the demodulation axes to make the level of the Q signal smaller.

It should be noted that the automatic hue correction of the present invention is carried out corresponding only to the level of the Q signal. In other words, the present hue adjustment is not affected by the degree of the gain of the amplification circuit 24 or the deflection between the characteristic for the hue correction by the hue adjustment circuit 9 and that of the Q signal. This is why a corrected result, which is the output signal of the hue adjustment circuit 9, is returned through the circuits 10, 11 and the demodulation circuit 12 to the composition circuits 22, 23. In other words, this is because the Q signal is formed by the (R−Y) signal and the (B−Y) signal and the automatic hue correction is performed so as to make the level of the Q signal smaller by rotating the demodulation axes.

FIG. 7A shows a detailed structure of the first composition circuit 22 shown in FIG. 3. This circuit can be composed of a simple network of resistors. This circuit can provide its output with the following Q signal;

$$Q = R_2(R-Y)/(R_1+R_2) + R_1(B-Y)/(R_1+R_2) \tag{1}$$

Assume that there exists a signal A, and that the (R−Y) component of the signal A is indicated as $V_R$ and the (B−Y) component thereof as $V_B$ as shown in FIG. 7B. Also, suppose that the symbols A, $V_R$ and $V_B$ designate the levels of the respective signals. In this case, the component Q on the Q axis of the signal A is expressed as the following;

$$Q = A \cdot \cos(\beta - \alpha). \tag{2}$$

Expanding the equation (2), we obtain $$Q = A\cos\beta\cos\alpha + A\sin\beta\sin\alpha = P\cdot\cos\beta + Q\cdot\cos\beta \tag{3}$$

wherein P and Q are constants. Further, because $\cos\beta = V_B/A$, and $\sin\beta = V_R/A$, the equation (3) can be transferred as the following;

$$Q = P\cdot V_B/A + Q\cdot V_R/A. \tag{4}$$

Therefore, the Q component of the equation (1) generates at the junction point of the resistor $R_1$ and $R_2$, or the output terminal of the first composition circuit 22, when the resistors $R_1$ and $R_2$ are selected so that $R_2/(R_1+R_2) = Q/A$ and $R_1/(R_1+R_2) = P/A$ are satisfied.

FIG. 8 is a detailed circuit diagram of the amplification circuit 24 shown in FIG. 3, wherein the symbols $Tr_1$ through $Tr_9$ show transistors, the symbols $R_3$ through $R_{12}$ show resistors, +Vcc shows a positive supply voltage and +B shows a positive bias voltage. A reference voltage (E) is applied to the base terminal of the transistor $Tr_2$ and the Q signal from the first composition circuit 22 is applied to the base terminal of the transistor $Tr_1$. The combination of the transistors $Tr_1$ and $Tr_2$ forms a differential amplifier, and each of the combination of the transistors $Tr_3$ and $Tr_7$ and the combination of the transistors $Tr_5$ and $Tr_6$ forms a current-mirror circuit. Each of the collector currents of the transistors $Tr_1$ and $Tr_2$ depends upon the Q signal. The collector current of the transistor $Tr_1$ is provided by the current-mirror circuit relative to the transistor $Tr_1$, and the output of this current-mirror circuit is supplied to the transistor $Tr_4$ through the transistors $Tr_8$ and $Tr_9$. On the other hand, the collector current of the transistor $Tr_2$ is provided by the current-mirror circuit relative to the transistor $Tr_2$. Therefore, the difference between the collector current of the transistor $Tr_3$ and that of the transistor $Tr_4$ is applied to a slide terminal of the tint volume 8 as the output signal of the amplication circuit 24, or the adjustment signal. This operation is active while the control signal from the control circuit 25 is applied to the emitter terminal of the transistor $Tr_{10}$.

FIG. 9 is a detailed circuit diagram of the second composition circuit 23 shown in FIG. 3, wherein $Tr_{11}$ through $Tr_{17}$ indicate transistors and $R_{13}$ through $R_{21}$ indicate resistors. The (B−Y) color difference signal is applied through the resistor $R_{18}$ to the base terminal of the transistor $Tr_{12}$, at the collector of which occurs a converted $(B-Y)$ signal, or $-(B-Y)$ signal. The $(R-Y)$ color difference signal is applied through the resistor $R_{15}$ to the base terminal of the transistor $Tr_{11}$, at the collector of which occurs a converted $(R-Y)$ signal, or $-(R-Y)$ signal. The $-(R-Y)$ signal is further converted by the current-mirror circuit composed of the transistors $Tr_{13}$ and $Tr_{14}$, and the resultant $(R-Y)$ signal occurs at the collector terminal of the transistor $Tr_{14}$. Thus, the $-(B-Y)$ signal and the $(R-Y)$ signal is composed at the base terminal of the transistor $Tr_{15}$ and then a resultant signal, which is the I signal is derived from the emitter terminal of the transistor $Tr_{15}$.

FIG. 10 is a block diagram of the second embodiment according to the present invention, wherein the same reference numerals show the same members as those shown in the previous figures. In this figure, a third composition circuit 25 composes the $(R-Y)$ color difference signal at the terminal 13 and the $(B-Y)$ color difference signal at the terminal 15 to generate a $(Q+\theta)$ signal at the output terminal thereof. A fourth composition circuit 26 composes the $(R-Y)$ color difference signal and the $(B-Y)$ color difference signal to generate a $(Q-\theta)$ signal at the output terminal thereof. A control circuit 27 detects the levels of the output signals of the composition circuits 23, 25 and 26 and then controls the operation of the amplification circuit 24 according to a condition described hereafter.

In operation, the $(R-Y)$ signal at the terminal 13 and the $(B-Y)$ signal at the terminal 15 are composed by the first composition circuit 22, which produces the Q signal at its output terminal. The Q signal is then amplified by the amplification circuit 24, which supplies the hue adjustment circuit 9 with the adjustment signal. On the other hand, the $(R-Y)$ signal and the $(B-Y)$ signal are composed by each of the composition circuits 23, 25 and 26, from which the I signal, the $(Q+\theta)$ signal and the $(Q-\theta)$ signal are derived, respectively. The $(Q+\theta)$ signal means a signal demodulated on the demodulation axis which is counterclockwise shifted by the angle $\theta$ relative to the Q axis. Likewise, the $(Q-\theta)$ signal means a signal demodulated on the demodulation axis which is clockwise shifted by the angle $\theta$ relative to the Q axis.

FIG. 11 shows the relationship between those axes when $\theta = 30°$, for example. Each of the I signal, the $(Q+\theta)$ signal and the $(Q-\theta)$ signal is compared with respective reference signals in level. The control circuit 27 can be configurated as shown in FIG. 12. In this figure, the positive power voltage $+Vcc$ is supplied to the collector terminals of transistors 30, 33 and 37. This voltage $+Vcc$ is also supplied through diodes (D) in series to the collector terminals of transistors 31, 34 and 36 and to the base terminal of an output transistor 28 and is further supplied through a resistor (R) to the emitter terminal of the transistor 28. The emitter terminals of the transistors (30,31), (33,34) and (36,37) are connected to constant-current sources 39, 40 and 41, respectively. The voltage ($V_{ref}$) is fed to the base terminal of the transistor 31. The other reference voltage ($V_r$) is supplied to the base terminals of the transistor 33 and 36. In operation, when the output transistor 28 becomes ON and a current is thus fed through an output terminal 29 to the amplification circuit 24 shown in FIG. 10, the amplification circuit 24 does not operate. On the contrary, with the output transistor 28 OFF, the amplification circuit 24 is changes to be in the operative mode. Detailed operation of the circuit is as follows. A first differential circuit 32 composed of the transistors 30 and 31 compares the I signal with the reference signal ($V_{ref}$). The first transistor 30 is O and the transistor 31 is OFF when the I signal exceeds the level of the reference signal. A second differential amplifier 35 composed of the transistors 33 and 34 compares the $(Q-\theta)$ signal applied to the transistor 34 with the reference signal ($V_r$). Assuming the level of the reference signal ($V_r$) is equal to a zero level of the $(Q-\theta)$ signal, the transistor 33 O and the transistor 34 OFF with the $(Q-\theta)$ signal negative. A third differential circuit 38 composed of the transistors 36 and 37 compares the $(Q+\theta)$ signal with the reference signal ($V_r$). With the $(Q+\theta)$ signal positive, the transistor 36 OFF and the transistor 37 ON. The amplification circuit 24 is therefore capable of operating only when the level of the I signal is large compared with that of the signal ($V_{ref}$), the $(Q+\theta)$ signal is positive and the $(Q-\theta)$ signal is negative, because the collectors of the transistors 31, 34 and 36 are commonly connected to the base terminal of the output transistor 28. This operative status corresponds to an area indicated by the shaded area (a) in FIG. 11. It will be therefore understood that the automatic hue correction is performed only when the chroma signal exists within the area (a) near the I axis. The other operation of the second embodiment is similar to that of the first embodiment described previously. It will be understood that the second embodiment can detect the chroma signal near the I axis to be corrected more precisely than the first embodiment.

FIG. 13 is a block diagram of the third embodiment according to the present invention. The feature of this embodiment is that an averaging circuit 42 is added to the circuit structure of the first embodiment of FIG. 3. The third embodiment can correct not only the hue of a color near a flesh color as described before but also can correct the hue of other colors. This kind of automatic hue correction is useful when the chroma signal always has a phase distortion because of, for instance, a wrong adjustment or a change of adjustment over a long time in a television receiver. The averaging circuit 42, the input of which is connected to the output terminal of the amplification circuit 24, supplies an averaged adjustment signal corresponding to an average of the adjustment signal derived from the amplification circuit 24 to the hue adjustment circuit 9. The averaging circuit 42 produces the averaged adjustment signal continuously, not only while it receives the adjustment signal from the amplification circuit 24, but also during a certain period after the supply of the adjustment signal is stopped. Supposing now that the color is changed from a color near flesh color into the other color. Then, the level of the I signal becomes smaller than that of the reference signal ($V_{ref}$) and thus the amplification circuit 24 stops the supply of the adjustment signal. However, the averaging circuit 42 continues to supply the averaged adjustment signal to the hue correction circuit 9 during the certain period thereafter. Thus, the color other than a color near flesh color is corrected corresponding to the average value of the deflection between a color near the flesh color and the flesh color itself. That is, all the colors are corrected.

FIG. 14A is a detailed circuit diagram of the averaging circuit 42 which is formed by a capacitor 43. One of two terminals of the capacitor 43 is connected to the output terminal of the amplification circuit 24 and the input terminal of the hue adjustment circuit 9, and the other is grounded. The Q signal derived from the first composition circuit 22 is amplified by the amplification circuit 24 in accordance with the control signal from the control circuit 25 and is then supplied to the capacitor 43 as the adjustment signal. The adjustment signal is smoothed by the capacitor 43, and an average adjustment signal, which corresponds to the averaged value of the adjustment signal, is fed to the hue adjustment circuit 9. A resistor 44 acts to prevent the load impedance of the averaging circuit 42 from varying in accordance with a position of the slide terminal between the fixed terminals of the hue volume 8. The averaged adjustment signal derived from the capacitor 43 corresponds to the average value of the deflection between a color near the flesh color and the flesh color itself, because the amplification circuit 24 operates only when the level of the I signal exceeds that of the reference signal ($V_{ref}$), that is, only when the chroma signal corresponds to a color near the flesh color. The level of the averaged adjustment signal is, of course, determined in accordance with the operative period of the amplification circuit 24. Also, the active period of the hue correction resulting from the averaged adjustment signal depends on the discharge time constant of the capacitor 43. It will be therefore understood that the control for the hue adjustment circuit 9 continues because of the charge stored in the capacitor 43 even after the supply of the adjustmen signal is stopped. That is, the automatic hue correction can be performed for not only a color near a flesh color but also other colors.

FIG. 14B is a detailed circuit diagram of the averaging circuit 42 which is formed by the combination of a resistor 45 and a capacitor 46 in series. An instant value of the adjustment signal from the amplification circuit 24 occurs since the terminal of the resistor 45 is connected to the input terminal of the amplification 24, while the adjustment signal is being delivered. Therefore, the correction of a color near a flesh color is instantaneously performed according to the instant value. On the other hand, the amplification circuit 24 stops operating when a color other than the color similar to flesh color is received. However, that color is also corrected according to the averaged adjustment signal resulting from the charge stored in the capacitor 46.

FIG. 14C is a detailed circuit diagram of the averaging circuit 42 which is composed of a resistor 47, capacitor 48 and a limiter 51 which is formed by a first diode 49 and a second diode 50. The common connection point of the resistor 47 and the capacitor 48 is connected to the cathode of the diode 49 and the anode of the diode 50. The other poles of the diodes 49 and 50 are connected to one of two terminals of the resistor 44, and the other of the resistor 44 is connected to the hue adjustment circuit 9. In this arrangement, the voltage across the capacitor 48 is, with reference to the voltage at the slide terminal of the hue volume 8, limited to $\pm V_f$ which is a voltage across the first and second diodes 49 and 50. The circuit of FIG. 14C is therefore useful when the hue deflection of a color near flesh color is larger than that of other colors.

FIG. 15 is a block diagram of an essential portion of the fourth embodiment according to the present invention, wherein the same reference numerals show the same members as those shown in the previous figures. The feature of this embodiment is that the hue correction of only a color near flesh color is performed in accordance with the averaged adjustment in accordance with the averaged adjustment signal. It should be noted that according to the first or second embodiment, the hue correction of a color near flesh color is performed in accordance with the adjustment signal which is not averaged. It should also be noted that according to the third embodiment, the hue correction of not only a color near flesh color but also of other colors. In FIG. 15, a second composition circuit 52 composes the (R−Y) color difference signal at the output terminal 13 and the (B−Y) color difference signal at the output terminal 15 and then produces the I signal, the $(Q+\theta_1)$ signal and the $(Q-\theta_1)$ signal. That is, the second composition circuit 52 corresponds to the combination of the second composition circuit 23, the third composition circuit 25 and the fourth composition circuit 26 shown in FIG. 10. A control circuit 53 is composed of a first control part 53A and a second control part 53B. The first control part 53A is identical with the control circuit 27 shown in FIG. 10. The second control part 53B compares each of the $(Q+\theta_1)$ signal and the $(Q-\theta_1)$ signal with the level of the reference signal ($V_{ref}$) and controls ON/OFF operation of a switch 54 interposed between the average circuit 42 and the hue adjustment circuit 9. The second control part 53B produces a switch controlling signal only when the level of the $(Q+\theta_1)$ signal is positive and the level of the $(Q-\theta_1)$ signal is negative. The second control part 53B can be formed by a similar circuit to that of FIG. 12.

In operation, while the chroma signal which exists within the shaded area (a) in FIG. 11 is applied to the demodulation circuit 12, the Q signal produced by the first composition circuit 22 is applied to the amplification circuit 24, which feeds the adjustment signal to the averaging circuit 42. The adjustment signal is smoothed by the capacitor in the averaging circuit 42, which generates the averaged adjustment signal corresponding to the mean value of the deflection between the I axis and the chroma signal. The second control circuit 53B is, at this time, generating the switch controlling signal to the switch 54. The switch 54 is therefore kept ON to couple the averaging circuit 42 with the hue adjustment circuit 9. The averaged adjustment signal from the averaging circuit 42 is thus supplied through the switch 54 to the hue adjustment circuit 9. As a result, the hue correction of a color near flesh color is performed in accordance with the average value of the deflection of the chroma signal with respect to the I axis. That is, when the chroma signal within the area (a) is applied to the demodulation circuit 12, the hue correction is performed.

On the other hand, the chroma signal which exists in the area (b) is applied to the demodulation circuit 12 of FIG. 15, the first control circuit 53A makes the amplification circuit 24 non-operable. The output signal of the amplification circuit 24 become zero. In this case, the control for the hue adjustment circuit 9 continues because of the charge stored in the capacitor in the averaging circuit 42 and then tries to supply the averaged adjustment signal to the hue adjustment circuit 9. This means that the hue adjustment circuit 9 tries to correct the chroma signal which corresponds to a color other than a color close to flesh color. However, at this time the switch controlling signal making the switch 54 OFF is fed from the second control circuit 53B to the switch 54. Therefore, the supply of the averaged adjustment signal derived from the averaging circuit 42 is stopped. the hue correction is not thus performed, when the chroma signal corresponding to a color other than a color close to flesh color is received. Furthermore, when the chroma signal within the area (c) of FIG. 11 is applied to the demodulation circuit 12 in FIG. 15, no control signal is fed form the first control circuit 53A to the amplification circuit 24. On the other hand, the switching control circuit is supplied from the second control circuit 53B to the switch 54. Therefore, the control for the hue adjustment circuit 9 is performed based upon the charge stored in the averaging circuit 42.

FIG. 16 is a block diagram of a variation of the circuit of FIG. 15, wherein the same reference numeals show the same members as those shown in the previous figures. A third composition circuit 55 composes the (R−Y) signal and the (B−Y) signal and produces a (Q−$\theta_2$) signal and a (Q+$\theta_2$). A second control circuit 56 compares the levels of the output signals derived from the third composition circuit 55 with those of the respective reference signals and feed a switch controlling signal to the switch 54 when a predetermined condition is satisfied. For the sake of understanding the phase relationship between the axes, one example of this relationship is shown in FIG. 17 when $\theta_1=30°$ and $\theta_2=40°$. The first control circuit 53 makes the amplification circuit 24 operate when the chroma signal within the area (a) is applied to the demodulation circuit 12. As described before, the first control circuit 53 operates to determine the range in which the mean value of the deflection between the chroma signal and the I axis is applied to the hue adjustment circuit 9 as the averaged adjustment signal. On the other hand, the second control circuit 56 turns the switch 54 ON when the chroma signal within the area (d) is applied to the demodulation circuit 12. That is, the second control circuit 56 turns the switch 54 ON with the chroma signal within the area (Q+40°) applied to the demodulation circuit 12. Therefore, when the received chroma signal is in the area (a), the hue correction is performed because of the average value of the deflection with reference to the area (a). When the applied chroma signal is within the area (d) and is not within the area (a), the switch 54 turns ON but the amplification circuit 24 does not operate. However, there exists the charge stored in the capacitor in the averaging circuit 42. Therefore, the same hue adjustment as that due to the chroma signal within the area (a) applied previously is continuously carried out. That is, the hue correction is also performed with the chroma signal satisfying the above condition applied to the demodulation circuit 12. Furthermore, when the chroma signal exists outside the area (d), the switch is OFF and no average adjustment signal is supplied to the hue adjustment circuit 9. That is, the hue correction is not thus performed. As apparent from the foregoing, it should be appreciated that the area (a) in which the average adjustment signal is formed is different from the area (d) in which the hue correction is performed.

FIG. 18 is a circuit diagram of the fifth embodiment according to the present invention, wherein the same reference numerals show the same members as those shown in the previous figures. This embodiment is directed to improve a problem which will arise when the embodiments described previously is applied to an integrated circuit on the market. Assuming now that in FIG. 13, the hue adjustment circuit 9, the phase shift circuits 10, 11 and the demodulation circuit 12 is included in a single integrated circuit (IC1), and the composition circuits 22, 23, the amplification circuit 24 and the control circuit 25 is included in the other integrated circuit (IC2). As well known, many kinds of the IC1 having different demodulation angle and demodulation ratios have been on the market. Also, the characteristics are slightly different from one another in even the same type of IC1s. Likewise, such a fact will apply to the first composition circuit 22 in the IC2. Therefore, the Q signal provided by composing the (R−Y) signal and the (B−Y) signal may not overlap with the Q axis. This error of the Q signal relative to the Q axis will bring about an incorrect hue adjustment. This embodiment is directed to improve such a problem.

The embodiment of FIG. 18 is one example based upon the third embodiment of FIG. 13. In this figure, one of terminals of a first variable resistor 57 is connected to the first terminal 13 of the demodulation circuit 12 contained in the IC2. The slide terminal of the resistor 57 is connected to a first input terminal 58 of the composition circuits 22 and 23 contained in the IC2. One of terminals of a second variable resistor 59 is connected to the other terminal of the first variable resistor 57, the other terminal is connected to the output terminal 15 of the demodulation circuit 12. The slide terminal of the second variable resistor 59 is connected to a second input terminal 60 of the composition circuits 22 and 23. In operation, if the (R−Y) signal and the (B−Y) signal at the terminals 13 and 15, respectively, are signals as shown in FIG. 19A, the Q signal as shown in the same will be produced at the output terminal of the first composition circuit 22. This Q signal must be corrected since it has the deflection toward the (R−Y) axis. In this case, the slide terminal of the second resistor 59 is adjusted so as to be positioned on the lowest side of its fixed resistor which means the resistance between the output terminal 15 and the input terminal 60 is zero), and the slide terminal of the first resistor 57 is then adjusted. Under this condition, parts of the (R−Y) signal and the (B−Y) signal are applied to the input terminal 58, and the (B−Y) signal is, with no attenuation, applied through the second input terminal 60 thereto. The output signal of the first composition circuit 22, therefore, becomes a Q' signal on the Q axis as shown in FIG. 19A. This adjustment is, in fact, carried out under the condition that a chroma signal corresponding to pure flesh color is applied to the demodulation circuit 12. A voltage meter is then connected to the output terminal of the amplification circuit 24. The adjustment of the resistor 57 is performed so that the indication of the voltage meter is zero by adjusting the slide terminal of the first variable resistor 57.

On the other hand, if the (R−Y) signal and the (B−Y) signal are produced at the output terminals 13 and 15, respectively, as shown in FIG. 19B, the Q signal is produced which has the deflection in the direction from the Q axis to the (B−Y) axis as shown in the same. Of course, this Q signal must be corrected. In this case, the slide terminal of the first variable resistor 57 is adjusted so as to be positioned on the highest side of its fixed resistor which means the resistance between the output terminal 13 and the input terminal 58 is zero), and the slide terminal of the second variable resistor 59 is then adjusted. Under this condition, the (R−Y) signal itself is, with no attenuation, applied to the first input terminal 58, and parts of the (R−Y) signal and the (B−Y) signal are applied to the second input terminal 60. The output signal of the first composition circuit 22, therefore, becomes a Q' signal as shown in FIG. 19B, existing on the Q axis.

The variable resistors 57 and 59 may be also connected as shown in FIG. 20. One of terminals of the first variable resister 57 is connected to the first output terminal 13, the other is grounded. Likewise, one of the terminals of the second variable resistor 59 is connected to the third output terminal 15 and the other is grounded. If the (R−Y) signal and the (B−Y) signal are signals as shown in FIG. 21A, the Q signal shown in the same will be derived from the output terminal of the first composition circuit 22. This Q signal has the deflection in the direction from the Q axis to the (R−Y) axis. In order to correct this deflection, the slide terminal of the second variable resistor 59 is adjusted so as to be positioned on the highest side of its fixed resistor, and the slide terminal of the first variable resistor 57 is then adjusted. Under this condition, an attenuated (R−Y) signal is applied to the first input terminal 58 and the (B−Y) signal itself is, with no attenuation, applied to the second input terminal 60. The output signal of the first composition circuit 22, therefore, becomes a Q' signal as shown in FIG. 21A, existing on the Q axis.

On the other hand, if the (R−Y) signal and the (B−Y) signal are signals, as shown in FIG. 21B, the Q signal as shown in the same will be produced which has the deflection in the direction from the Q axis to the (B−Y) axis. In order to correct this Q signal, the slide terminal of the first variable resistor 57 is slid so as to be positioned on the highest side of its fixed resistor, and the slide terminal of the second variable resistor 59 is then adjusted. Under this condition, the (R−Y) signal itself is, with no attenuation, applied to the first input terminal 58, and an attenuated (B−Y) signal are applied to the second terminal 60. The output signal of the first composition circuit 22, therefore, becomes a Q' signal as shown in FIG. 21B.

The above explanation as to the correction of the Q signal has been given as a example that resistors are applied to the circuit of FIG. 13. Of course, those resistors can be applied to the other embodiments described previously.

From the foregoing, it will now be apparent that a new automatic hue correction circuit has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An automatic hue correction circuit in a color television receiver, comprising;
   demodulation means for demodulating three color difference signals from a chroma signal which is separated from a received composite video signal,
   first composition means for composing a Q signal by using the demodulated color difference signals,
   second composition means for composing an I signal by suing the demodulated color difference signals,
   amplification means for producing an adjustment signal which is formed from the Q signal derived from the first composition means,
   hue correction means for supplying to the demodulation means a subcarrier signal for rotating demodulation axes in the demodulation means so that a level of the Q signal becomes smaller in accordance with the adjustment signal derived from the amplification means, and
   control means for making the amplification means active when a level of the I signal derived from the second composition means exceeds a reference level.

2. An automatic hue correction circuit according to claim 1 wherein the automatic hue correction circuit further comprises third composition means for composing a $(Q+\theta)$ signal by using the demodulated color difference signals, and fourth means for composing a $(Q-\theta)$ signal by using the demodulated color difference signals, the control means making the hue correction means active when each of levels of the I signal, the $(Q+\theta)$ signal and the $(Q-\theta)$ signal reaches respective reference levels.

3. An automatic hue correction circuit according to claim 1, wherein the automatic hue circuit further comprises averaging means for averaging the adjustment signal derived from the amplification means and supplyin a resultant averaged adjustment signal to the hue correction means.

4. An automatic hue correction circuit according to claim 3 wherien the averaging means is formed by a capacitor, one terminal of which is coupled with the output of the amplification means and the input of the hue adjustment means, the other terminal being grounded.

5. An automatic hue correction circuit according to claim 3 wheein the averaging means is formed by a series circuit of a resistor and a capacitor, one terminal of the series circuit being coupled with the output of the amplification means and the input of the hue adjustment means, and the other terminal of the series circuit being grounded.

6. An automatic hue correction circuit according to claim 5, wherein the averaging means further comprises a limiter, one terminal of which is coupled with the junction terminal of the resistor and capacitor, the other being coupled with the input terminal of the hue adjustment circuit.

7. An automatic hue correction circuit according to claim 3 wherein the automatic hue correction circuit further comprises switching means for controlling supply of the averaged adjustment signal from the averaging means to the hue adjustment means, based upon the level of the Q signal from the first composition means.

8. An automatic hue correction circuit according to claim 1 wherein the automatic hue correction circuit further comprises adjustment means for adjusting the levels of the demodulated color difference signals derived from the demodulation means and supplying adjusted demodulated color difference signals to the first composition means and the second composition means.

* * * * *